United States Patent [19]

Allen

[11] 4,335,540

[45] Jun. 22, 1982

[54] COMBINED PLANT CONTAINER AND WATERING DEVICE

[76] Inventor: Ron P. Allen, 6003 Arbor Rd., Lakewood, Calif. 90713

[21] Appl. No.: 211,467

[22] Filed: Nov. 28, 1980

[51] Int. Cl.³ ............................................. A01G 25/00
[52] U.S. Cl. ........................................................ 47/79
[58] Field of Search ..................................... 47/79–81

[56] References Cited

U.S. PATENT DOCUMENTS

| | | | |
|---|---|---|---|
| 1,081,825 | 12/1913 | Glassco | 47/41 |
| 2,648,164 | 8/1953 | Bruch | 47/79 |
| 4,056,899 | 11/1977 | Close | 47/79 |
| 4,174,589 | 11/1979 | Daharsh | 47/79 X |
| 4,265,050 | 5/1981 | Buescher | 47/79 |

OTHER PUBLICATIONS

Langer, R. W. (1975) "An Indoor Ecology Guide", *Grow It Indoors*, Saturday Review Press/E.P. Dutton & Co. Inc., N.Y. p. 273 (only).

Primary Examiner—James R. Feyrer
Attorney, Agent, or Firm—William C. Babcock

[57] ABSTRACT

A water reservoir defining plant container that has a manually actuated pump operatedly associated therewith, which pump when actuated by the user discharges a fine mist or spray on the soil and plant situated in the container. The container has ports in the lower portion thereof through which excess water in the soil in the container may drain into a shallow dish situated below the container. The dish is preferably in removable engagement with the container, to prevent inadvertant separation of the container and dish, when the container is moved from a position it normally occupies.

2 Claims, 5 Drawing Figures

U.S. Patent    Jun. 22, 1982    4,335,540
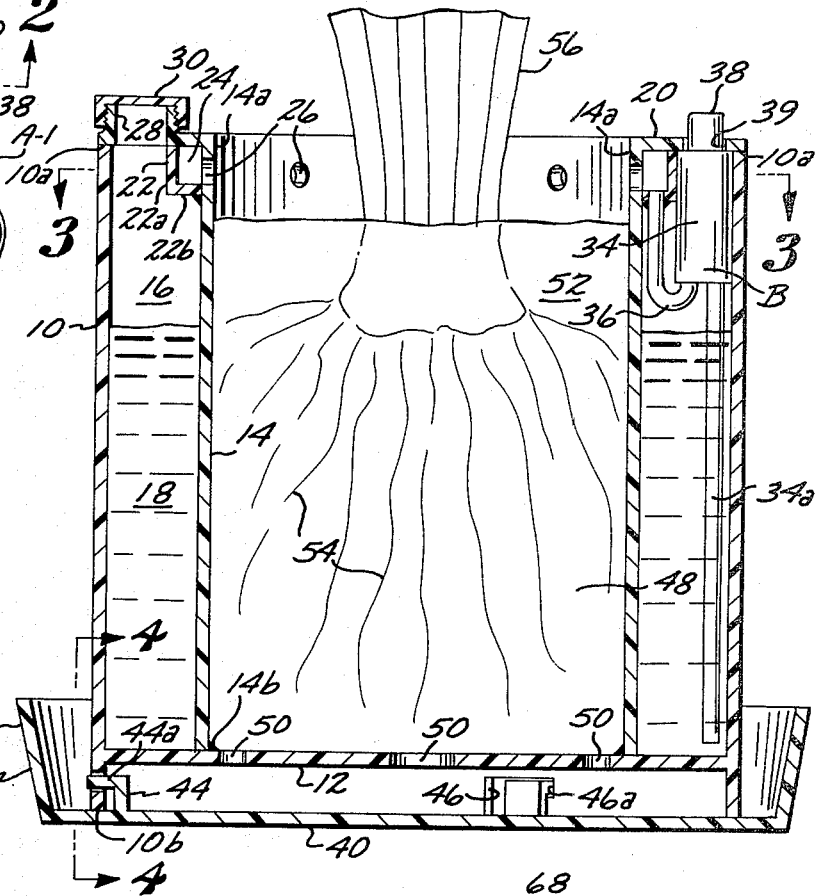
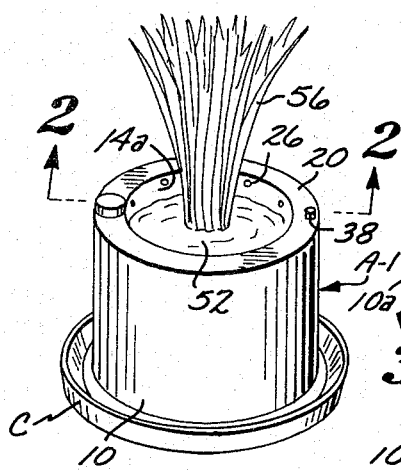
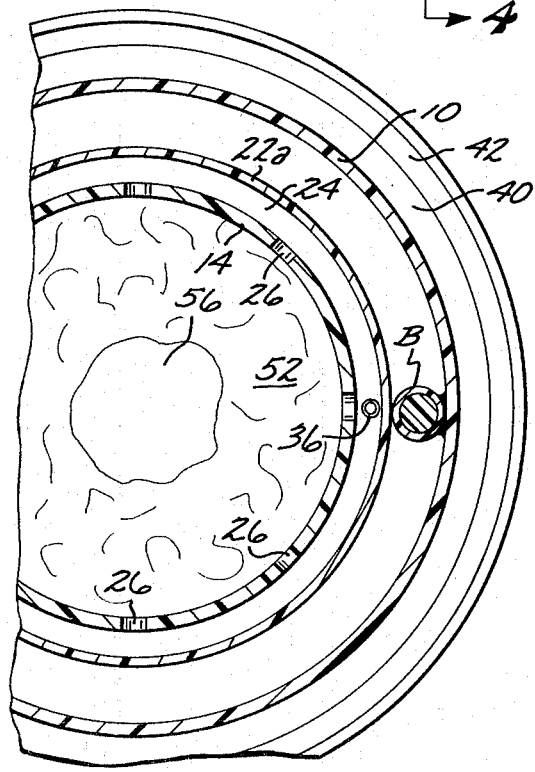
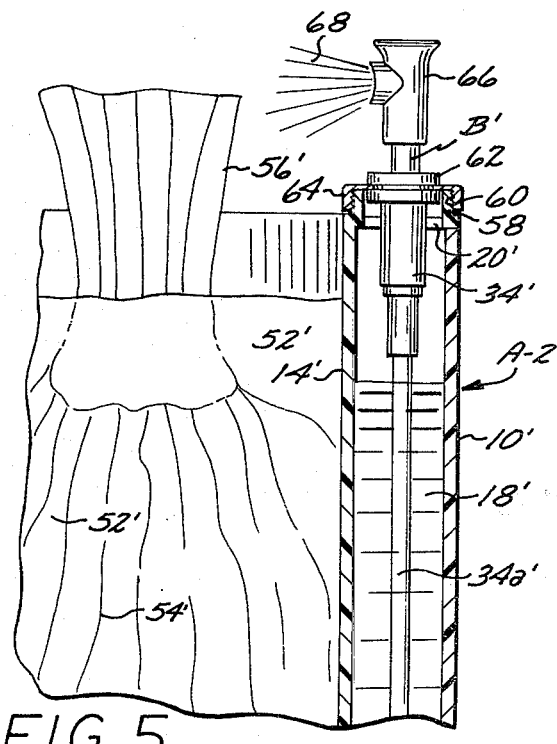

COMBINED PLANT CONTAINER AND WATERING DEVICE

BACKGROUND OF THE INVENTION

1. Field of the Invention
Combined Plant Container and Watering Device

2. Description of the Prior Art
House plants are normally grown in soil situated in a pot or container. Watering of the plants of this type involve adding small amounts of water periodically to the soil in which the root systems are situated. Such watering may result in irregular distribution of the water to the soil, or due to the inconvenience in watering, the plant may not receive water in sufficient quantity as to have optimum growth.

A major object of the present invention is to minimize the time and inconvenience of taking care of house plants by watering the same, by providing a water reservoir defining container in which the soil for the plant is situated, and a container having a manually operably pump included as an integral part thereof to permit the plant to be spray watered periodically by simply actuating the pump a few times.

Another object of the invention is to furnish a water reservoir defining container and associated pump that have a simply mechanical structure, may be fabricated from standard commercially available materials, requires a minimum of attention in operating and assures that even distribution of water in the form of a mist or spray to the plant and surrounding soil by periodic actuation of the pump. A further object of the invention is to furnish a plant container surrounded by a clear plastic transparent water reservoir, and the water therein capable of being colored to conform to the motif of the room in which it is situated.

These other objects and advantages of the invention will become apparent from the following description of first and second forms thereof, which forms are hereinafter described in greater detail.

SUMMARY OF THE INVENTION

The combined plant container and watering device includes an outer vertically disposed shell of desired configuration that has a transverse member disposed therein and situated a short distance above the lower edge of the outer shell. An inner shell of substantially less diameter than the outer shell is concentrically disposed in the latter and has the lower end sealed to the transverse member.

The upper ends of the outer and inner shells lie in substantially a common horizontal plane and are joined by a ring shaped top. The two shells, the transverse member and the top cooperate to define a confined space that serves as a reservoir for water. The inner shell and transverse member cooperate to provide a cup shaped cavity in which soil is disposed that has the root system of the plant situated therein.

The ring shaped top has an opening therein through which water may be periodically introduced into the reservoir, with the opening normally having a closure member removably mounted thereon.

The top serves the functions of sealing the reservoir from contact with the embient atmosphere to minimize evaporation of the water from the reservoir, providing means to introduce water into the reservoir, and also as a support for a manually operated pump.

The pump in a first form of the invention when actuated discharges a spray of water from the reservoir into a ported duct that extends around the watering device above the soil therein, and as the pump is actuated a spray is discharged from the duct onto the soil surrounding the plant. In a second form of the invention the pump discharges a spray directly onto the soil from the reservoir from a fixed position relative to the latter.

BRIEF DESCRIPTION OF THE DRAWING

FIG. 1 is a perspective view of a first form of my combined plant container and watering device;

FIG. 2 is a longitudinal cross sectional view of the plant container taken on the line 2—2 of FIG. 1;

FIG. 3 is a transverse cross sectional view of the device shown in FIG. 2 taken on the line 3—3 thereof;

FIG. 4 is a fragmentary enlarged side elevational view of a lower portion of the device shown in FIG. 2 and illustrating the manner in which a shallow dish is removably locked to the plant container; and FIG. 5 is a longitudinal cross sectional view of a portion of a second form of the combined plant container and watering device.

DESCRIPTION OF THE PREFERRED EMBODIMENT

In FIGS. 1 and 2 a first form A-1 of my combined plant container and watering device is shown, in which it will be seen that it includes an outer generally cylindrical shell 10 that has a top edge 10a and lower edge 10b. Although the shell 10 is illustrated as being cylindrical, it may be in any desired configuration.

The shell 10 has a transverse member 12 bonded to the interior surface thereof and located a relatively short distance above the lower edge 10b as may best be seen in FIG. 2. An inner shell 12 is provided that is of the same general configuration as the outer shell 10, but is of substantially less diameter than the outer shell 10. The inner shell 10 has a top edge 10a as may best be seen in FIG. 2.

The inner shell 14 has the lower edge thereof bonded to the transverse member 12 by conventional means 14b such as glue, heat sealing or the like. The top edges 10a and 14a have a ring shaped top 20 extending therebetween. The inner and outer shells 10 and 14, transverse member 12, and top 20 cooperate to define a confined annulus shaped space 16 that serves as a reservoir for water 18. A circumferentially extending L shape flange 22 depends downwardly from the top 20 within the confined annulus space 16 as may be seen in FIG. 2, which flange includes a vertically extending first leg 22a that has the upper end secured to the lower surface of the top 20, and a horizontal leg 22b that has the free end thereof secured to the exterior surface of the inner shell 14. The flange 22 in cooperates to define a ring shaped duct 24 that is in communication with a number of circumferentially spaced apertures 26 formed in the inner shell 14.

A tubular boss 28 extends upwardly from the top 20 and is in communication with a hole formed in the latter, with the boss being removably engaged by a closure cap 30. When the cap 30 is removed, water may be poured downwardly through the boss 28 to fill the reservoir to approximately the level shown in FIG. 2. After the water filling up operation is completed, the cap 30 is mounted on the boss 28. Due to the construction above described, a minimum amount of water evaporates from the reservoir 16, as the only communication between the reservoir and the ambient atmosphere is through the apertures 26. A water spray dispensing pump B of conventional design is provided, such as currently used on window cleaning solution holding containers, which pump includes a generally cylindrical body 34 that has an elongate water intake tube 34a depending downwardly therefrom, and a water discharge tube 36 extending from the body 34. The pump body 34 as may be seen in FIG. 2 is disposed in the upper portion of the annulus space 16, with the upper portion of the body 34 being secured to the lower surface of the top 20 by conventional means (now shown), such as gluing or the like.

The pump B is actuated by a vertically movable button 38 that extends upwardly through an opening 39 formed in the top 20. The first form of plant container A-1 as may be seen in FIG. 2 preferably includes a shallow dish C that has a flat bottom 40 and a side wall 42 that extends upwardly and outwardly therefrom. The bottom 40 has a number of circumferentially spaced inverted L shaped legs 44 projecting upwardly therefrom, each of which legs includes a generally horizontal lug 44a that may be removably inserted in any one of a number of slots 46 formed in the lower portion of outer shell 10, and each slot having an extension 46a. By rotation of the plate C relative to the outer shell 10, the lugs 44a may be removably inserted in the extensions 46a to removably secure the dish C to the outer shell 10 and prevent the inadvertant separation of the dish and outer shell.

The inner shell 14 and the transverse member 12 cooperate to define a confined space 48 that may be filled with soil 52, and in which soil the roots 54 of a plant 56 are embeded. The transverse member 12 has a number of spaced excess water drain openings 50 formed therein, and should the soil 52 become overly saturated, excess water will flow downwardly through the drain openings 50 into the dish C.

The use and operation of the first form A-1 of the invention is extremely simple. The soil 52 is disposed in the confined space 48 and surrounds the roots 54 of the plant 56. Water is added to the annulus space 16 that serves as a reservoir, with the water level being just below the lower portion of the pump B. Water is added to the water inlet boss 28 after the cap 30 is removed therefrom. When it is desired to water the plant 56, the button 38 is pressed downwardly in succession, to discharge a spray of water from the reservoir 16 upwardly through the discharge tube 36 into the duct 24, and the spray flowing outwardly through the apertures 26 to impinge on the upper surface of the soil 52 and the lower portion of the plant 56.

Thus, it will be seen that the plant 56 may be periodically watered by a simple manual operation and with a minimum of inconvenience to the user of the device. Excess water that may be added to the soil 52 by use of the pump B, will drain downwardly from the soil through the openings 50 into the dish C.

An alternate or second form A-2 of the invention is shown in FIG. 5 that is similar to the first form A-1, and differs from the latter in that the L shaped flange 20 is eliminated, and the opening 39 is replaced by an upwardly extending boss 58 that has threads 60 formed on the exterior thereof. Those elements in the second form A-2 that are common to the first form are identified by the numerals and letters previously used but which have primes affixed thereto. A conventional spray forming pump B' is provided, that includes a body 34', and water intake 34a', with the body 34' having an enlarged portion 62 that is engaged by an internally threaded cap 64 that removably engages the threaded boss 58. The pump B' includes a spray head 66 which when moved upwardly and downwardly relative to the body 34' discharges a spray of water 68 onto the plant 56' and the soil 52'. The second form A-2 of the invention performs substantially the same function as the first form A-1 and is also mounted in a dish C in the same manner as the first form A-1.

The use and operation of the two forms of the invention have been described previously in detail and need not be repeated.

What is claimed is:

1. In combination with a quantity of soil, a plant having roots embedded in said soil, and a quantity of colored water, a container for so supporting said soil that said plant and roots may be watered at desired time intervals, said container including:
   a. an assembly that includes outer cylindrical shell that has upper and lower ends; a bottom disposed within said cylindrical shell and bonded to the interior thereof upwardly from said lower end; an inner cylindrical shell of substantially less external diameter than the interior diameter of said outer shell, said inner shell bonded to said bottom and extending upwardly therefrom to terminate in an upper end substantially the same height as said upper end of said outer shell; a ring shaped top that extends between said upper ends of said inner and outer shells; a tubular boss that extends upwardly from an opening in said top; a cap that removably and sealingly engages said boss; said top, outer and inner cylindrical shells and a portion of said bottom cooperating to define an annulus shaped confined space, said outer and inner shells at least being transparent, said annulus shaped space capable of being substantially filled with said colored water by use of said tubular boss when said cap is removed therefrom; said bottom and said inner cylindrical shell cooperating to define a confined space that holds said soil and roots with said plant extending upwardly from said assembly;
   b. a manually actuatable water pump that has a spray defining discharge and a downwardly extending tubular inlet, said water pump mounted on said top with said inlet extending downwardly into said annulus shaped space, with said colored water in said annulus shaped space adding an attractive appearance to said assembly and at least partially concealing said soil in said confined space;
   c. a shallow dish that includes a flat bottom and an upwardly extending side wall, said lower end of said outer shell resting on said bottom of said dish; and
   d. means for removably securing said dish to dish outer cylindrical shell, with said pump when manually actuated discharging a spray of said colored water onto said plant, and excess water that accumulates in said soil flowing through an opening in said bottom supported by said outer shell into said dish.

2. A container as defined in claim 1 which in addition includes:
   e. means for defining a ring shaped confined space on the upper inner end of said inner cylindrical shell, said ring shaped confined space in communication with said water spray discharge of said pump, and water spray after being discharged into said ring shaped space flowing outwardly therefrom through a plurality of openings in said means onto said soil in said confined space.

* * * * *